United States Patent
Kido

(10) Patent No.: US 6,308,243 B1
(45) Date of Patent: Oct. 23, 2001

(54) METHOD AND SYSTEM FOR CONTROLLING EXCLUSIVE ACCESS TO SHARED RESOURCES IN COMPUTERS

(75) Inventor: Kazutaka Kido, Tondabayashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/111,522

(22) Filed: Jul. 8, 1998

(30) Foreign Application Priority Data

Jul. 8, 1997 (JP) .................................................. 9-182816

(51) Int. Cl.$^7$ ...................................................... G06F 13/00
(52) U.S. Cl. ............................ 711/147; 711/148; 711/154
(58) Field of Search .................................... 709/100, 101, 709/102, 103, 104, 107; 710/200, 220, 240, 241; 711/147, 148, 154

(56) References Cited

U.S. PATENT DOCUMENTS 5,623,670 * 4/1997 Bohannon et al. ................... 710/200
5,625,795 * 4/1997 Sakakura et al. .................... 711/148

FOREIGN PATENT DOCUMENTS 8-329019    12/1996  (JP) .

* cited by examiner

Primary Examiner—Majid A. Banankhah
(74) Attorney, Agent, or Firm—Darby & Darby

(57) ABSTRACT

A computer system for controlling a process, which obtains an exclusive control module (semaphore X, Y, Z) indicating an exclusive use right of a resources (HDD 13, video buffer 140, audio buffer 150, etc.,) commonly shared by two or more processes (task A, B etc.,), so as to obtain the exclusive use right of the resource corresponding to the exclusive control module obtained by said process, and for controlling the process, when said process releases the exclusive control module, so as to lose the exclusive use right of the resource corresponding to the released exclusive control module, wherein exception handlers in which a procedure for processing a resource exclusively controlled by the corresponding semaphore after the task is abnormally terminated is defined for each of semaphore; and when the task is terminated with the semaphore being obtained, activating the exception handler defined corresponding to the semaphore. Accordingly, in case that the task in the computer system is abnormally terminated with the semaphore being obtained, the exception handler releases the semaphore definitely and safely.

3 Claims, 11 Drawing Sheets

METHOD AND SYSTEM FOR CONTROLLING EXCLUSIVE ACCESS TO SHARED RESOURCES IN COMPUTERS

BACKGROUND OF THE INVENTION

The present invention relates to an exclusive control method for a computer system, more particularly, a method of giving the right to one single task for exclusively using one of shared resources which are shared by a number of tasks (or processes), and to a computer system employing the exclusive control method.

In a variety of application apparatuses having embedded microcomputers, a real time multitask system is used for processing a number of tasks. In such multitask system, in the case where plural tasks use one resource (shared resource such as a hard disk drive), state of the resource (storing contents when the resource is a hard disk drive) is destroyed by accessing from plural tasks without control. It is thus necessary for the multitask system to exclusively control over the access of the plural tasks to one resource, more specifically, to give a right to one of the plural tasks for exclusively using the resource at one time.

A conventional multitask system includes an exclusive control module termed "semaphore" for carrying out the foregoing exclusive control. The term, semaphore, stands for a railroad device which sends signals using its arms. The semaphore used in a computer system remains held in its reset state by an Operating System (OS) when the resource is used by none of the tasks. When one of the task intends to access the resource, it has to receive a right of exclusive use from the OS and the semaphore is turned to the set state.

While the semaphore for a particular resource is set, the access of the other tasks to the resource is inhibited by the OS.

The conventional exclusive control method for a computer system using the semaphore is now explained referring to the schematic diagram of FIG. 1. The example is designed in that when a task A intends to access a resource X, a P operation (for obtaining the semaphore; a V operation for returning) has to be carried out to a semaphore S corresponding to the resource X.

FIG. 1 illustrates steps of allowing the task A to reach an access function for the resource X, operating the P operation for the semaphore S, and carrying out the access to the resource X. It is now assumed that while the task A is turned to sleeping by any reason such as standby for the accessing resource during the access of the task A to the resource X, a task B runs and reaches the access function for the resource X. The task B then starts operating the P operation for the semaphore S. However, since the semaphore S has been already obtained by the task A (P operation), the task B is turned to sleeping with the P operation for the semaphore S till the semaphore S is returned by the task A (V operation).

These steps conform a procedure incorporating the conventional exclusive control method for a computer system with the semaphore. It should be understood that when the semaphore S is returned by the task A (V operation), it allows the task B to carry out to obtain the semaphore S (P operation) for access to the resource X.

The steps are explained with an existing computer system in more detail. For example, the conventional exclusive control method is executed in the computer system which has an arrangement shown in the block diagram of FIG. 2.

As shown in FIG. 2, the computer system comprises substantially a CPU 11, a main memory (RAM) 12, a hard disk drive (HDD) 13, a camera 14, a microphone 15, and a direct main memory access controller (DMAC) 16, etc. connected to each other by a bus 10. The bus 10 is connected to the camera 14 via a video buffer 140 for buffering video data, the microphone 15 via an audio buffer 150 for buffering audio data, and the HDD 13 via a hard disk (HD) controller 130 for controlling the HDD 13. The HDD 13 is accessed by the DMAC 16 (for writing and reading data).

It is assumed that the access to the HDD 13 in the computer system is carried out by a plurality of tasks (A, B, and so on). The task A carries out processing for writing a video data produced and taken by the camera 14 into the HDD 13, and the task B carries out processing for writing an audio data produced and taken by the microphone 15 into the HDD 13, according to a multitask processing. The other tasks than the two tasks A and B such as a task for accessing the video buffer 140 coupled to the camera 14 and a task for accessing the audio buffer 150 coupled to the microphone 15 are included. Since the resources such as the HDD 13, the camera 14, and the microphone 15 are accessed by two or more tasks including the tasks A and B, the exclusive control using the semaphore has to be conducted.

FIG. 3 is a flow chart showing a procedure of the task A in which the audio data taken by the camera 14 is transferred to the main memory 12 and written into the HDD 13 using the DMAC 16.

The task A remains in its sleeping state until the video buffer 140 is fully written with the video data from the camera 14 (Step S11). When the video buffer 140 has fully been written, it enables an interrupt from the video buffer 140 and a wake up instruction is issued to the task A by the interrupt handler, thereby waking up the task A. As the task A is waken up, it performs the P operation for a semaphore X to exclusively control the video buffer 140 (Step S12) and obtains the right for accessing the video buffer 140.

As the task A has obtained the right for accessing the video buffer 140, the video data is transferred from the video buffer 140 to the main memory 12 (Step S13) and the V operation for the semaphore X is carried out to release the right by accessing the video buffer 140 by the task A (Step S14). It is then judged whether or not the main memory 12 has received one block (unit for transfer to the HDD 13) of the video data (Step S15). Until the main memory 12 is written with one block of the video data ("NO" at Step S15), the Step S11 through the Step S11 are repeated.

When it is judged that the main memory 12 has received one block of the video data ("YES" at Step S15), the task A performs the P operation for a semaphore Y to exclusively control the HDD 13 (Step S16), and obtains the right for accessing the HDD 13.

As the task A obtains the right for accessing the HDD 13, a DMA transfer for transferring the video data from the main memory 12 to the HDD 13 is set (Step S17). Then, the video data is transferred by the DMAC 16 from the main memory 12 to the HDD 13 while the task A remains at its sleeping state until the transfer is completed (Step S18). After the DMA transfer is finished, an interrupt for the task A is carried out to issue a wake up instruction to the task A by the interrupt handler, thereby waking up the task A. As the task A has been waken up, it starts the V operation for the semaphore Y (Step S19) and releases the right for the HDD 13. The procedure is then returned back to Step S11.

FIG. 4 shows a flow chart of procedure of the task B where the audio data taken by the microphone 15 is transferred to the main memory 12 and written into the HDD 13 using the DMAC 16.

The task B remains in its sleeping state until the audio buffer 150 is fully written with the audio data taken by the microphone 15 (Step S21). When the audio buffer 150 has fully been written, an interrupt from the audio duffer 150 is carried out to issue a wake up instruction to the task B by the interrupt handler, thereby waking up the task B. As the task B is waken up, it performs the P operation for a semaphore Z for exclusively controlling the audio buffer 150 (Step S22) and obtains the right for accessing the audio buffer 150.

As the task B has obtained the right for accessing the audio buffer 150, the audio data is transferred from the audio buffer 150 to the main memory 12 (Step S23) and the V operation for the semaphore Z is carried out to release the right of the accessing of the audio buffer 150 by the task B (Step S24). It is then judged whether or not the main memory 12 has received one block (unit for transfer to the HDD 13) of the audio data (Step S25). Until the main memory 12 is written with one block of the audio data ("NO" at Step S25), the Step S21 through the Step S24 are repeated.

When it is judged that the main memory 12 has received one block of the audio data ("YES" at Step S25), the task B performs the P operation for the semaphore Y to exclusively control the HDD 13 (Step S26), and obtains the right for accessing the HDD 13.

As the task B obtains the right for accessing the HDD 13, a DMA transfer for transferring the audio data from the main memory 12 to the HDD 13 is set (Step S27). Then, the audio data is transferred by the DMAC 16 from the main memory 12 to the HDD 13 while the task B remains at its sleeping state until the transfer is completed (Step S28). After the DMA transfer is finished, an interrupt for the task B is carried out to issue a wake up instruction to the task B by the interrupt handler, thereby waking up the task B. As the task B has been waken up, it starts the V operation for the semaphore Y (Step S29) and releases the right for accessing the HDD 13. The procedure is then returned back to Step S21.

In that manner, the video data taken from the camera 14 and the audio data taken from the microphone 15 are temporarily stored in their respective buffers and stored in the HDD 13 through multitask processing of the tasks A and B. However, when the task A is abnormally terminated during its execution by any reason, the following process will be different depending on whether it happens during the access to the video buffer 140 or the access to the HDD 13. When the task A is abnormally terminated during the access to the video buffer 140, resetting of the video buffer 140 is needed. When the task A is abnormally terminated during the access to the HDD 13, stopping the DMA transfer and resetting of the HD controller 130 are needed.

Similarly, when the task B is abnormally terminated during its execution by any reason, the following process will be different depending on whether it happens during the access to the audio buffer 150 or the access to the HDD 13. When the task B is abnormally terminated during the access to the audio buffer 150, the resetting of the audio buffer 150 is needed. When the task B is abnormally terminated during the access to the HDD 13, stopping the DMA transfer and resetting of the HD controller 130 are needed.

In addition, while one task obtains a semaphore (P operation) and is accessing the corresponding resource, the other tasks stay in their sleeping state as standing by for the returning of the semaphore (V operation). This causes the entire system to be maintained in an unfavorable condition.

A variety of modifications have been proposed for overcoming the foregoing problems. For example, a first method for inhibiting the termination of the task which has obtained semaphore (as depicted in VxWorks 5.0 Reference Manual 1–352 issued by Wind Rever System). The method may be advantageous in inhibiting the condition of standing by for returning of the semaphore but produce a counteraction due to no completion of the task which should be terminated finished. It is however unknown how the counteraction affects the entire system itself. In other words, any possible critical damage to the system will hardly be identified and avoided.

A second modification is proposed in which when the task obtaining a semaphore is abnormally terminated, the system or namely its OS forces the task to release the semaphore (as depicted in the same VxWorks 5.0 Reference Manual 1–352 issued by Wind Rever System). In this method, however, when the release of the semaphore is executed by not grasping the current status of the resource related to the semaphore, there is possibility to generate unexpected fault by releasing the semaphore.

A third modification is known using exception handlers. While a group of the exception handlers are defined to corresponding events which may cause the task to he abnormally terminated. Each exception handler is described so as to release the semaphore after clearing up the access for the resource by the task to be terminated with monitoring state of the resources (as depicted in $\mu$ITRON 3.0 Standard Handhook, pp. 304 to 307).

However, according to the third method, it is necessary to identify the resource handled by the task when the task is abnormally terminated for carrying out a proper post-termination of operation. Also, the more the number of the resources to be processed by the task, the harder the resource which is processed by the task at the time of termination will he identified. For the purpose, an extra program may be needed for operating a flag for ease of the judgement. This makes the program of the task more intricate. The procedure for abnormal termination will also be less simplified. As the programs become bulky in size, their maintenance will be troublesome.

The third method may be less burdened from the above problems in case that the exception handler can accurately be described. It is however common that the exception handlers are roughly defined to their corresponding events, such as bus error and issue of forced termination, which may quite the task. This is not compatible with an elaborate operation for access of any of the multiple tasks to a definite one of the resources. In the third method depicted in $\mu$ITRON 3.0 Standard Handbook, one exception handler is defined to one definite event throughout the system.

It is also possible with another OS that one exception handler is defined to one cause for each task. For accurately describing the exception handler, such the situation shown in FIG. 1 has to be also defined by the exception handler. More specifically, a system is feasible in that the exception handlers are defined to more detailed events; e.g. the task A is abnormally terminated when it reaches a particular location in the operation function for the resource X. In practice, realizing the system to which exception handlers for such detailed events are registered is too complex to practically use. It is hence accepted to use the exception handlers defined to major events provided by the conventional OS.

As explained above, the conventional methods fail to release the semaphores definitely and safely with the use of appropriate exception handler.

BRIEF SUMMARY OF THE INVENTION

It is an object of the present invention, in view of the foregoing aspects, to provide an exclusive control method for a computer system in which a semaphore can be released by an exception handler definitely and safely.

An exclusive control method for a computer system according to the present invention controls a process, which obtains an exclusive control module indicating an exclusive use right of a resource commonly shared by two or more processes, so as to obtain the exclusive use right of the resource corresponding to the exclusive control module obtained by the process, and controls the process, when the process releases the exclusive control module, so as to lose the exclusive use right of the resource corresponding to the released exclusive control module. Moreover, the method according to the present invention comprises the steps of: registering for each of exclusive control modules a program in which a procedure for processing a resource exclusively controlled by the corresponding exclusive control module after the process is abnormally terminated is described; and when the process is terminated with the exclusive control module being obtained, activating the program registered corresponding to the exclusive control module.

In such exclusive control method for a computer system according to the present invention, when the process is abnormally terminated with the exclusive control module being obtained, the program i.e. the exception handler in which a procedure for processing the resource after the process is abnormally terminated registered corresponding to the obtained exclusive control module is activated.

A computer system according to the present invention has a plurality of shared resources whose exclusive use rights by a process are indicated by respective exclusive control modules, and in which, when a process obtains one of exclusive control modules, the process is controlled so as to obtain an exclusive use right of the resource corresponding to the exclusive control module obtained by the process, and when the process releases the exclusive control module, the process is controlled so as to lose the exclusive use right of the resource corresponding to the released exclusive control module. Moreover, the computer system according to the present invention comprises: exclusive control module managing means to which an information identifying a program in which a procedure for processing a resource exclusively controlled by the corresponding exclusive control module after the process is abnormally terminated is registered, for each of the exclusive control modules; process managing means, when the process obtains the exclusive control module, to which an information identifying the exclusive control module obtained by the process is recorded; means for, when the process is abnormally terminated with the exclusive control module being obtained, reading the information identifying the exclusive control module from the process managing means of the process; and means for reading and activating the program in which the procedure for processing the resource after the process is abnormally terminated is described from the exclusive control module managing means of the exclusive control module identified by the read out information.

In the computer system according to the present invention, when the process is abnormally terminated with the exclusive control module being obtained, the information specifying the exclusive control module is read from the process managing means of the process and the program that is the exception handler in which a procedure for processing the resource after the process is abnormally terminated is read out from the exclusive control module managing means of the exclusive control module identified by the read out information and activated.

The above and further objects and features of the prevent invention will more fully be apparent from the following detailed description with accompanying drawings.

DESCRIPTION OF THE PREFERRED EMBODIMENT

One embodiment of the present invention will he described in more detail referring to the accompanying drawings.

The exclusive control method for a computer system and computer system according to the present invention is maximally characterized by registering an exception handler i.e. a program in which an abnormal termination procedure of a resource exclusively control by a semaphore corresponding to the semaphore i.e. an exclusive control module. More particularly, it is characterized by registering an exception handler for cause the task obtaining a semaphore to be terminated abnormally in accordance with each semaphore. In such an exclusive control method for a computer system according to the invention, the exception handler registered corresponding to a semaphore performs the clearing up and so on of the resource being controlled by the semaphore after the task is abnormally terminated during it is obtaining the semaphore.

Figure 5:
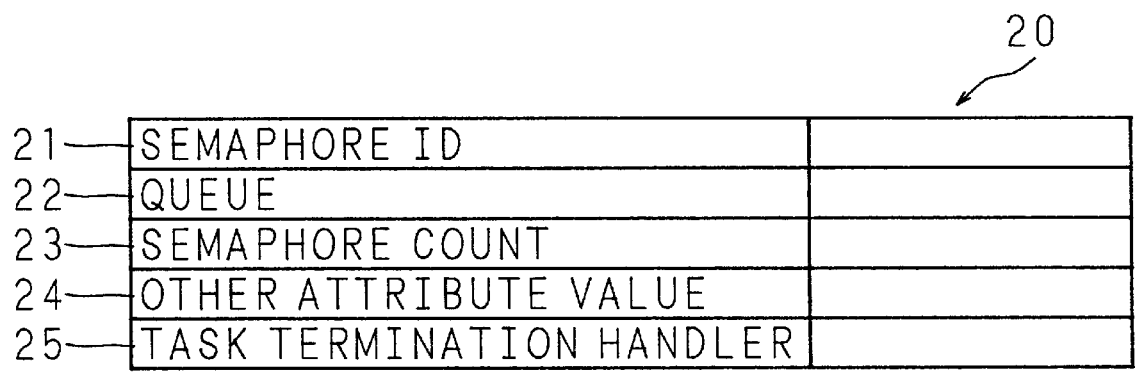
FIG. 5 is a schematic view of a structure of data for managing the semaphore according to the exclusive control method for a computer system of the present invention.

FIG. 5 is a schematic diagram showing a data structure for the semaphore management in the exclusive control method for a computer system and the computer system according to the present invention.

A semaphore management data 20 which is used in an exclusive control method for a computer system as well as a computer system according to the present invention comprises a semaphore ID field 21 for specifying each semaphore, a standby queue field 22 for registering a task which stands by for release of the semaphore, a semaphore count field 23, an attribute field 24, which all are common to the conventional semaphores, and in particular, a task termination handler field 25 for recording the start address of a program which is called when the task obtaining the semaphore has been terminated.

Figure 6:
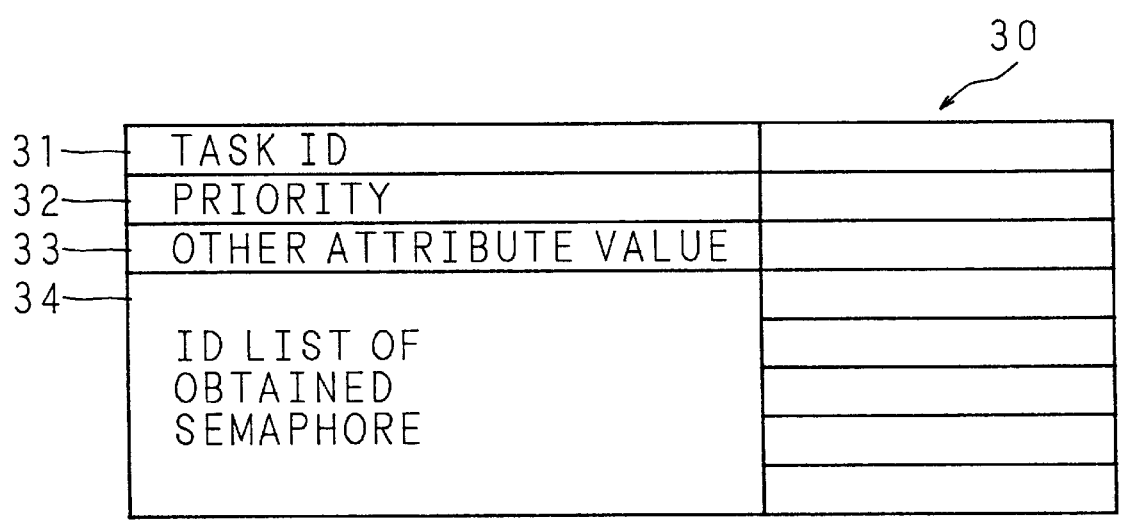
FIG. 6 is a schematic view of a structure of data for controlling the task according to the exclusive control method for a computer system of the present invention.

FIG. 6 is a schematic diagram showing a data structure for the task management in the exclusive control method for a computer system and the computer system according to the present invention.

The task management data 30 used in the exclusive control method for a computer system and the computer system according to the present invention comprises a task ID field 31 for specifying each task, a task priority field 32, an attribute field 33, which all are common to the conventional tasks, and particularly, a semaphore ID list field 34 for recording the semaphore ID of all the semaphores obtained by the task.

Figure 7A:
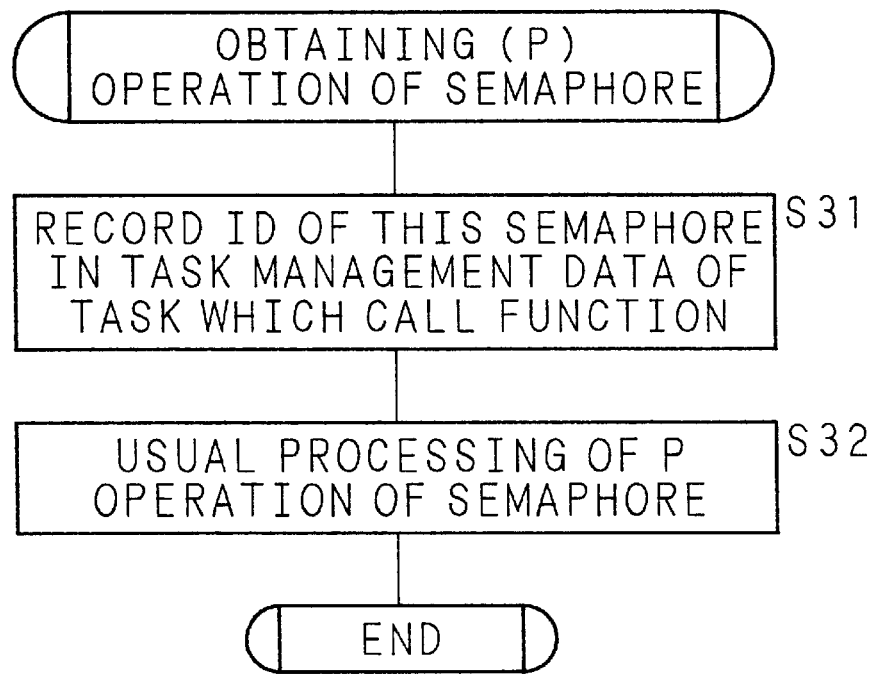
FIG. 7A is a flow charts showing a procedure (P operation) of the task obtaining the semaphore.
Figure 7B:
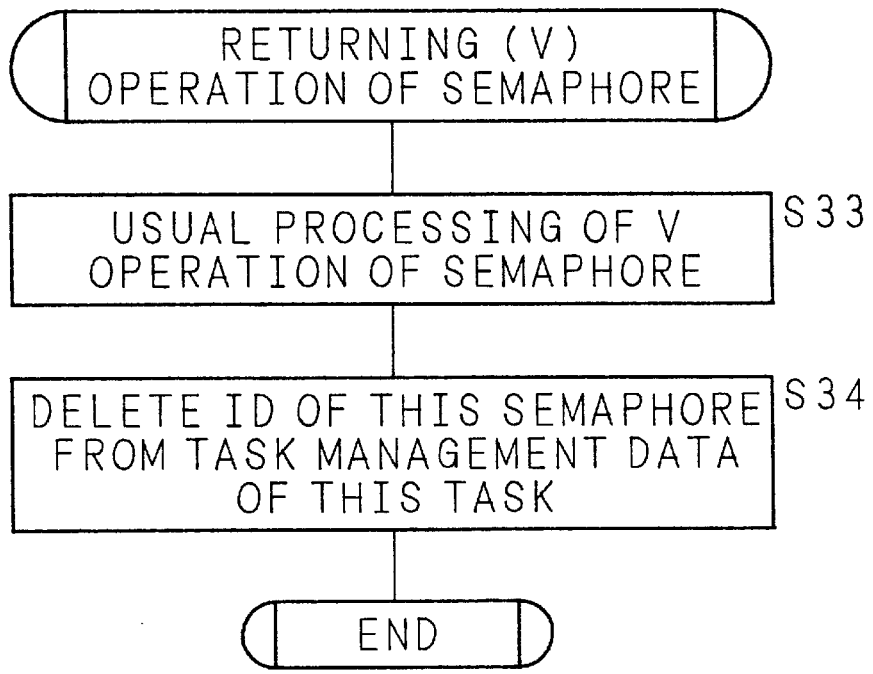
FIG. 7B is a flow charts showing a procedure (V operation) of the task obtaining the same according to the exclusive control method for a computer system of the present invention.

Using the semaphore management data 20 shown in FIG. 5 and the task management data 30 shown in FIG. 6, the exclusive control method for a computer system according to the present invention, unlike the conventional methods, allows each task to obtain a semaphore (P operation) as shown in the flow chart of FIG. 7A and return the semaphore (V operation) as shown in the flow chart of FIG. 7B.

As shown in FIG. 7A, the processing of obtaining a semaphore (P operation) is carried out by the following steps. When a task has reached an access function for a resource, a semaphore ID of a semaphore corresponding to the resource is registered to the semaphore ID list field 34 of the task management data 30 shown in FIG. 6 of that task (Step S31). Then, the P operation follows (Step S32) similar to the conventional method.

Also, the processing of returning a semaphore (V operation) shown in FIG. 7B is carried out by the following steps. The V operation is first carried out (Step S33) similar to the conventional method. Then, the semaphore ID of the semaphore to be returned is deleted from the semaphore ID list field 34 of the task management data 30 shown in FIG. 6 of that task (Step S34).

Figure 8:
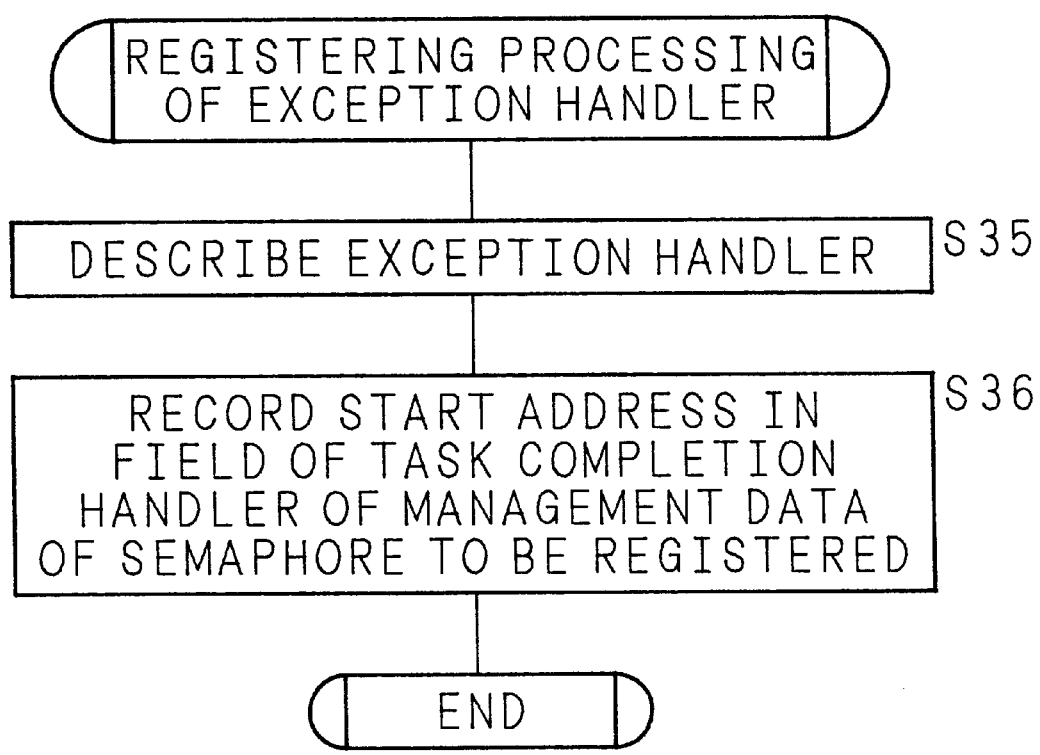
FIG. 8 is a flow chart showing a procedure of registering an exception handler to the semaphore according to the exclusive control method for a computer system of the present invention.

Moreover, the exclusive control method for a computer system and the computer system according to the present invention has an extra function for registering exception handlers for the purpose at time when the task which has obtained the semaphore and accessing the corresponding resource is abnormally terminated as shown in the flow chart of FIG. 8.

The procedure for registering an exception handler to the semaphore starts with describing the exception handler (Step S35). Then, the start address of the exception handler to he registered to the semaphore is recorded in the task termination handler field 25 of the semaphore management data 20 shown in FIG. 5 (Step S21).

Figure 9:
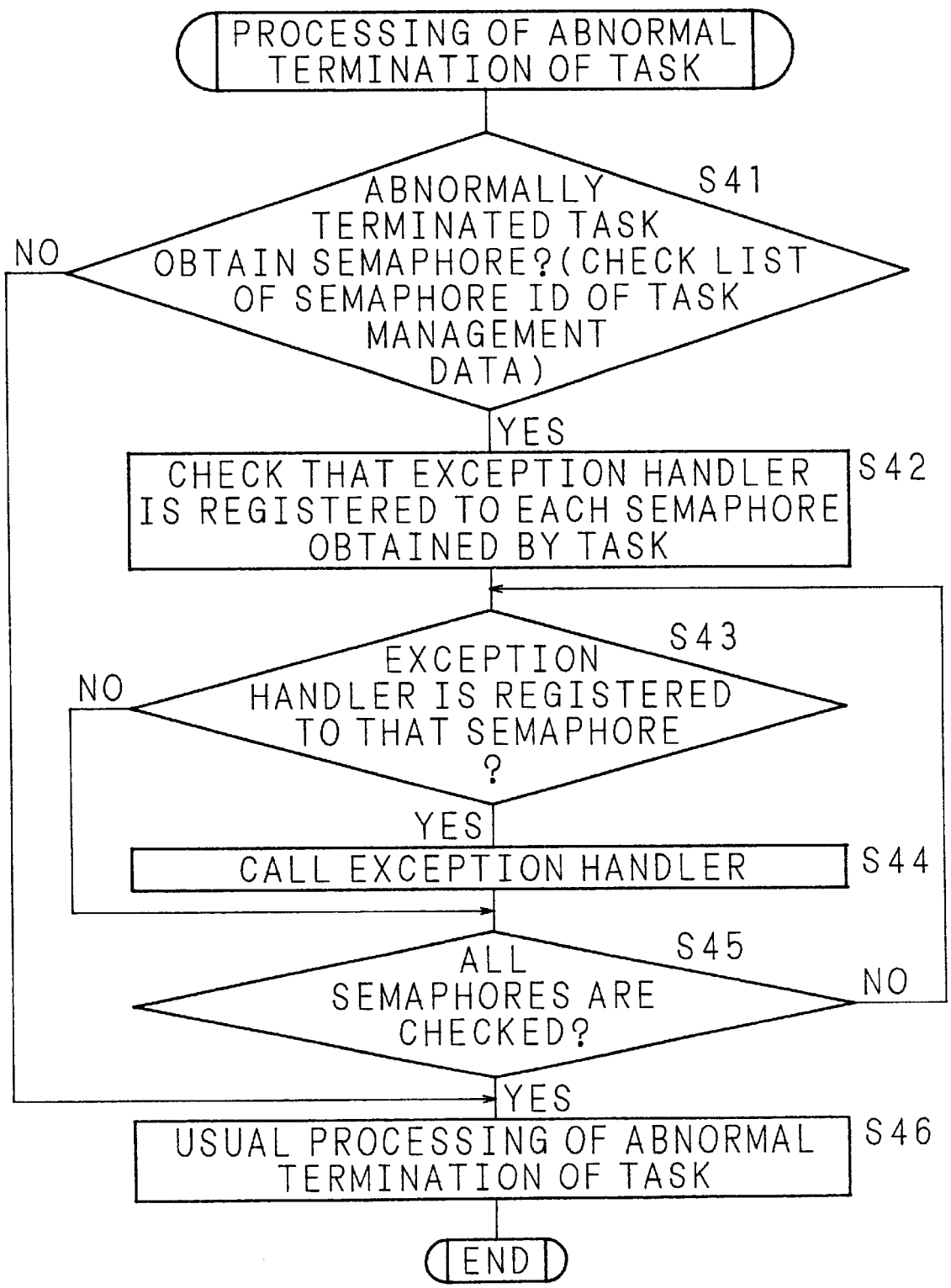
FIG. 9 is a flow chart showing a procedure performed after the task is abnormally terminated according to the exclusive control method for a computer system of the present invention.

The abnormal termination procedure of the task having obtaining the semaphore to which the exception handler is registered through carrying out the P operation as mentioned above is explained referring to a flow chart shown in FIG. 9.

When abnormal termination processing of the task is started, it is judged whether or not it obtains the semaphore (Step S41). This step is implemented by checking the semaphore ID list field 34 of the task management data 30 shown in FIG. 6. When the task abnormally terminated has not obtained the semaphore ("NO" at Step S41), the abnormal termination processing similar to prior art is executed (Step S46).

When the task abnormally terminated has obtained the semaphore ("YES" at Step S41), it is judged whether exception handler is registered or not about all the semaphores obtained by the task (Step S42). More particularly, it is checked whether the exception handler is registered or not to the task termination handler field 25 of the semaphore management data 20 shown in FIG. 5 with respect to all semaphores obtained by the tasks. This is now explained in more detail.

At first, it is judged whether the exception handler is registered or not to the task termination handler field 25 of the semaphore management data 20 shown in FIG. 5 corresponding to the first semaphore ID in the semaphore ID list field 34 of the task management data 30 shown in FIG. 6 (Step S43). When the exception handler is registered ("YES" at Step S43), the registered exception handler is called (Step S44). It is then checked whether the exception handler is registered or not about all semaphores is judged (Step S45). Until the check for the registration of the exception handler about all semaphores is completed (when "NO" at Step S45), the procedure is returned to Step S43. When the exception handler is not registered to the semaphore at Step 43 ("NO" at Step S43), the procedure goes to Step S45 where the registration of the exception handler is judged about all semaphores. When it is judged "NO" at Step S45, the procedure returns back to Step S43.

According to the procedure shown in FIG. 9, when the task which has been abnormally terminated obtains any one semaphore to which an exception handler is registered, the exception handler is called. The exception handler registered to such semaphore executes processing such as clearing up of the resource exclusively controlled by the semaphore at the time when the task which obtained the semaphore is abnormally terminated.

Figure 1:
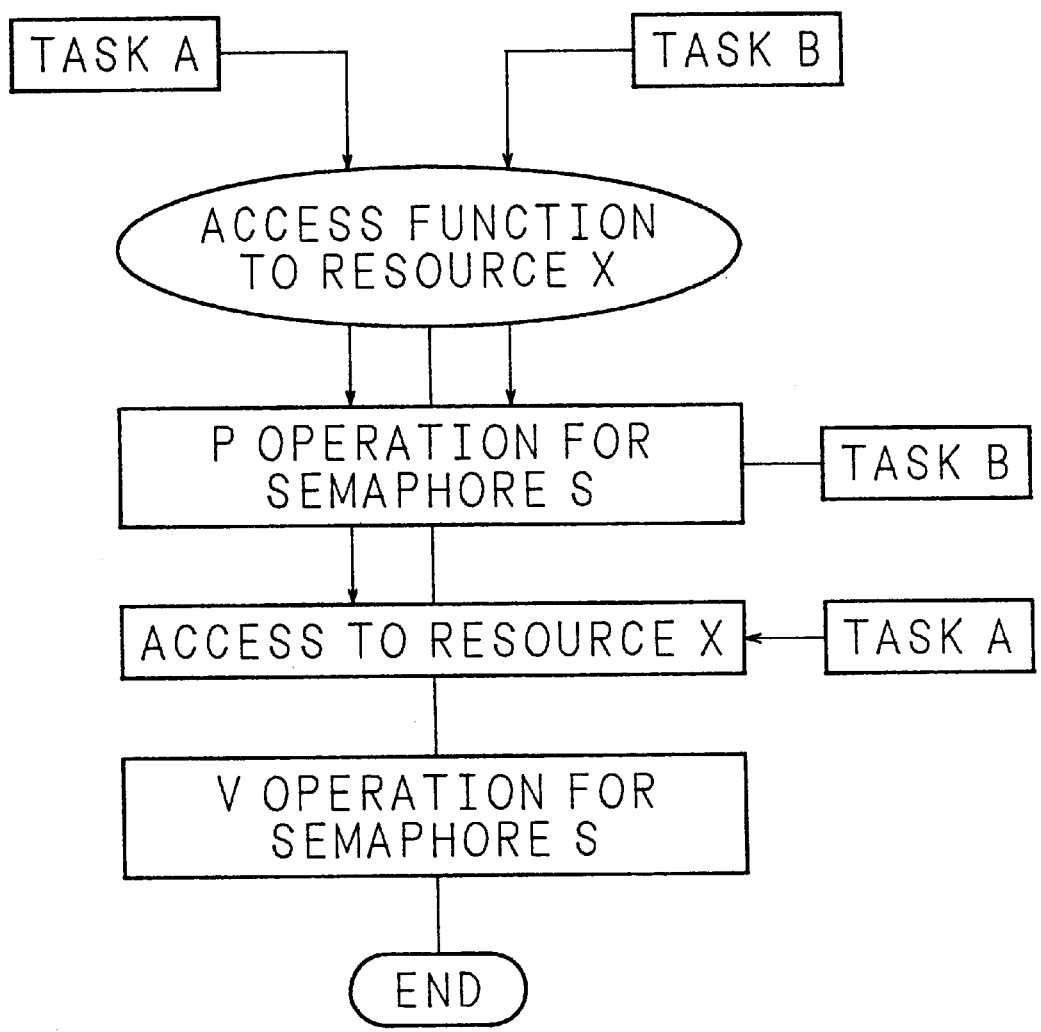
FIG. 1 is a schematic view explaining a conventional exclusive control method for a computer system employing semaphores.
Figure 2:
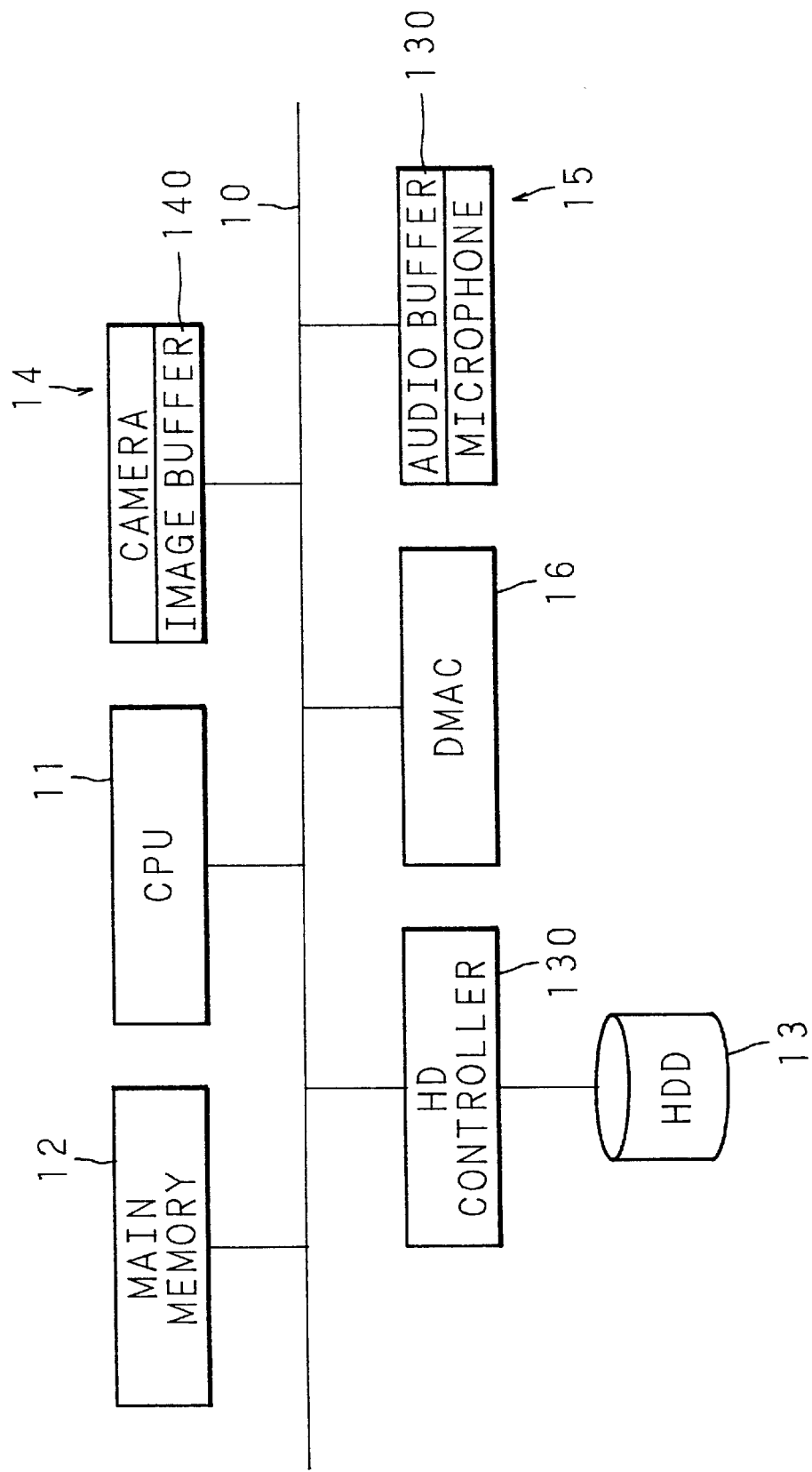
FIG. 2 is a schematic block diagram showing a construction of the computer system used for carrying out the conventional exclusive control method as well as an exclusive control method of the present invention.
Figure 3:
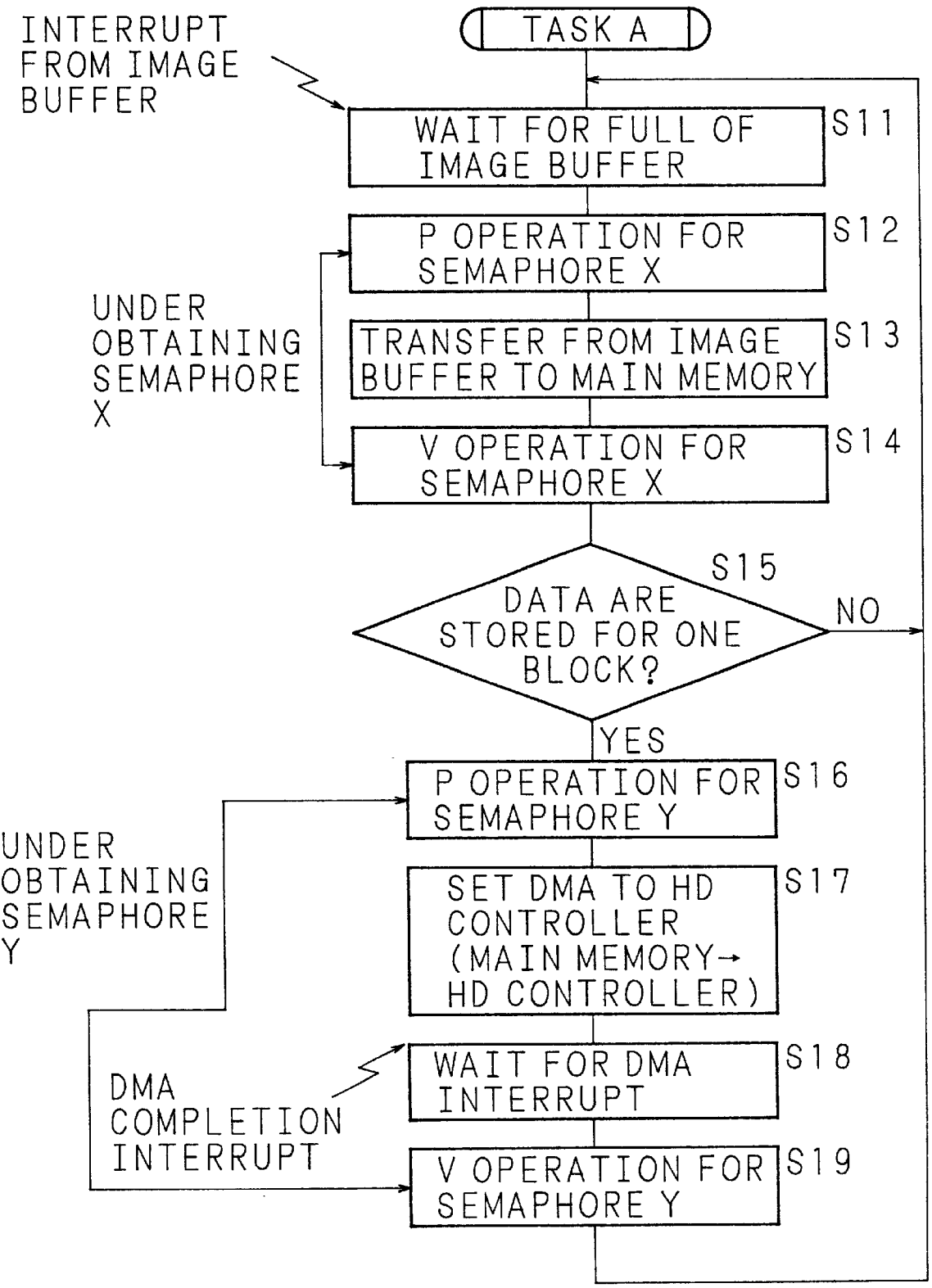
FIG. 3 is a flow chart showing a procedure of a task according to the conventional exclusive control method in the computer system.
Figure 4:
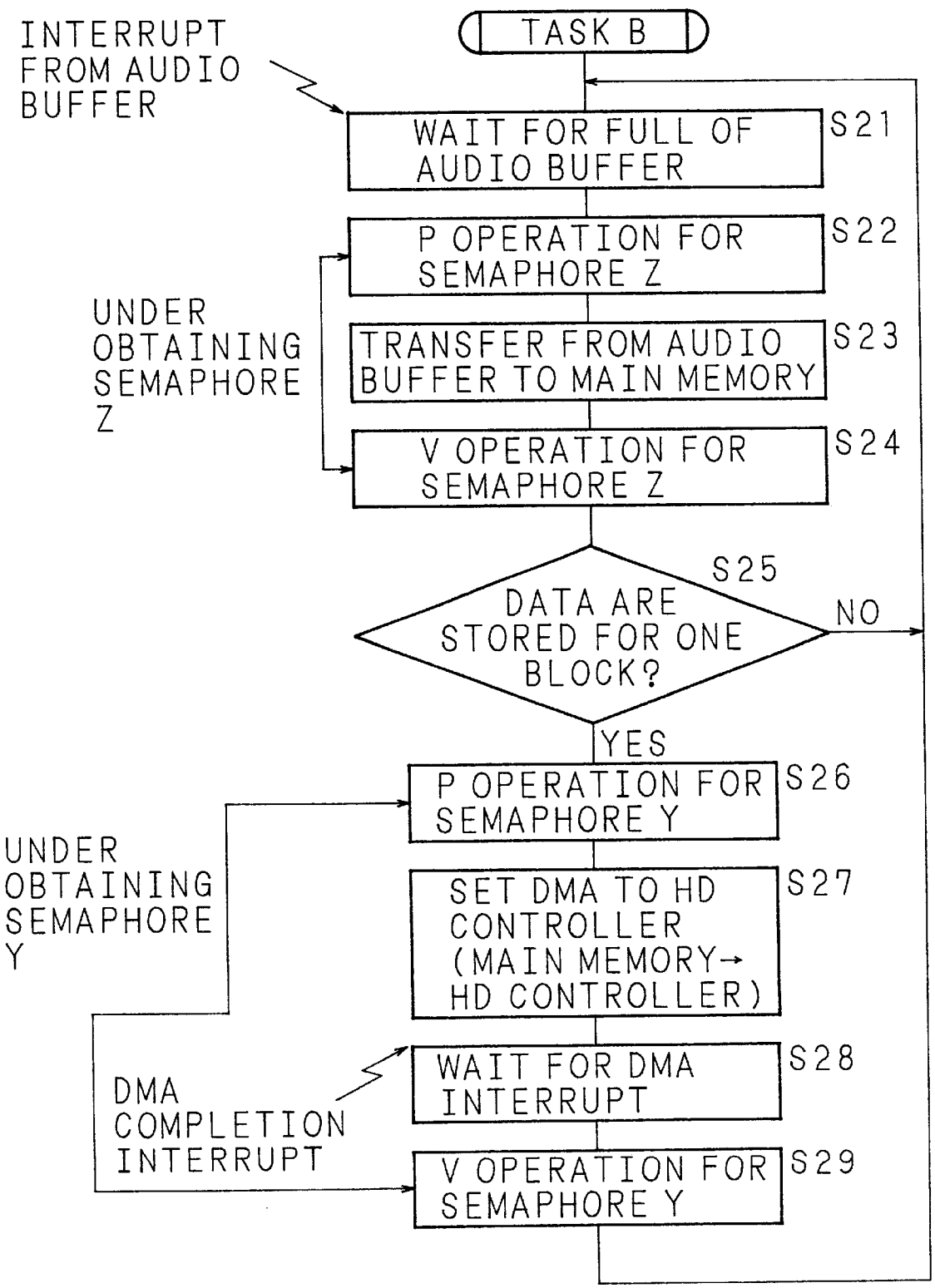
FIG. 4 is a flow chart showing a procedure of another task according to the conventional exclusive control method in the computer system.

The application to a practical computer system is explained. It is assumed that the exclusive control method is used with such a computer system as shown in the block diagram of FIG. 2.

As described previously, the computer system shown in FIG. 2 has the CPU 11, the main memory (RAM) 12, the hard disk drive (HDD) 13, the camera 14, the microphone 15, and the direct main memory access controller (DMAC) 16 connected to each other by the bus 10. The bus 10 is connected to the camera 14 via the video buffer 140 for buffering a video data, the microphone 15 via the audio buffer 150 for buffering an audio data, and the HDD 13 via the hard disk (HD) controller 130 for controlling the HDD 13. The HDD 13 is accessed through the DMAC 16 (for writing and reading a data).

In such computer system, the access to the HDD 13 is requested by two or more tasks (A, B, and so on). The task A processes writing of the video data taken by the camera 14 into the HDD 13 and the task B processes writing of the audio data taken by the microphone 15 into the HDD 13, by a multitask processing. Also, other tasks than A and B such as for accessing the video buffer 140 connected to the camera 14 and for accessing the audio buffer 150 connected to the microphone 15 are included. Since resources such as the HDD 13, the camera 14, and the microphone 15 are accessed by two or more of the tasks including the tasks A and B, the exclusive control using the semaphores is necessary.

Figure 10:
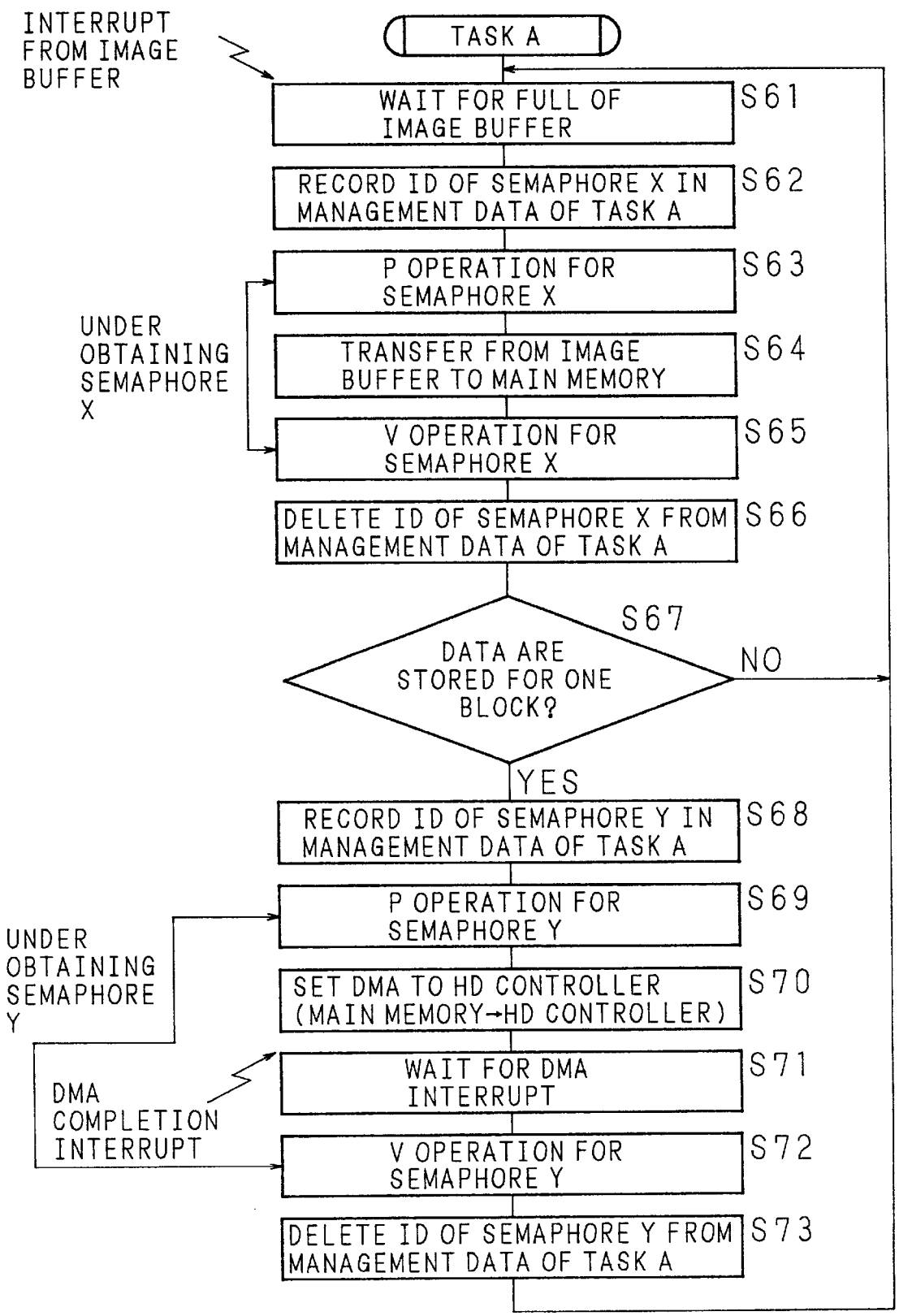
FIG. 10 is a flow chart showing a procedure of a task according to the exclusive control method of the present invention in the computer system.

FIG. 10 is a flow chart showing a procedure of transferring the video data taken by the camera 14 to the main memory 12 and writing it into the HDD 13 using the DMAC 16.

The task A remains in its sleeping state until the video buffer 140 is fully written with the video data from the camera 14 (Step S61). When the video buffer 140 has fully been written, an interupt from the video buffer 140 is carried out to issue a wake up instruction to the task A by the interupt handler, thereby waking up the task A. As the task A is waken up, the ID of a semaphore X is recorded in the semaphore ID list field 31 of the task management data 30 of the task A (Step S62). Then, the semaphore X is subjected to the P operation for exclusively controlling the video buffer 140 (Step S63), so that the right for accessing the video buffer 140 is given to the task A.

As the task A has obtained the right for accessing the video buffer 140, the video data is transferred from the video buffer 140 to the main memory 12 (Step S64), and then the V operation for the semaphore X (Step S65) follows to release the right by the task A for accessing the video buffer 140, and the ID of the semaphore X is deleted from the task management data 30 of the task A (Step S66). It is then judged whether or not the main memory 12 has received one block (unit of transfer to the HDD 13) of the video data (Step S67). The Step S61 through Step S66 are repeated until the main memory 12 is written with one block of the video data ("NO" at Step S67).

When it is judged ("YES" at Step S67) that the main memory 12 has received one block of the video data, the ID of a semaphore Y is recorded to the semaphore ID list field 34 of the task management data 30 of the task A (Step S68). Then, the semaphore Y is subjected to the P operation for exclusively controlling the HDD 13 (Step S69), and the right for accessing the HDD 13 is given to the task A.

As the task A obtains the right for accessing the HDD 13, a DMA transfer for transferring the video data from the main memory 12 to the HDD 13 is set (Step S70). As a result, the DMAC 16 transfer the video data from the main memory 12 to the HDD 13 while the task A remains at its sleeping state until the transfer is completed (Step S71). After the DMA transfer is finished, an interupt occurs to issued a wake up instruction to the task A in the interupt handler, thereby waking up the task A. As the task A has been waken up, it executes the V operation for the semaphore Y (Step S72) to release the right for accessing the HDD 13, and then the ID of the semaphore Y is deleted from the task management data 30 of the task A (Step S73). The procedure is then returned back to Step S61.

Figure 11:
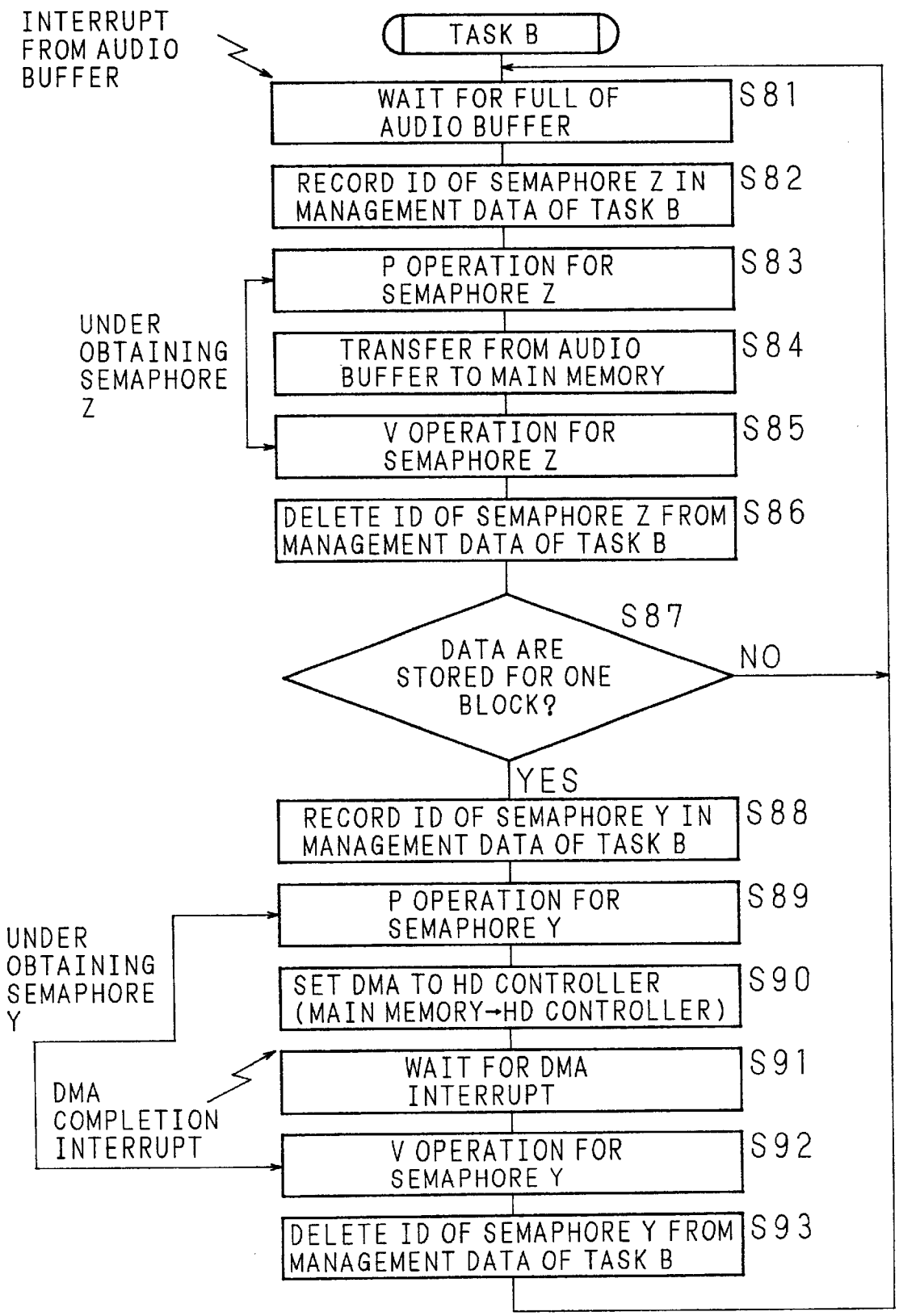
FIG. 11 is a flow chart showing a procedure of another task according to the exclusive control method of the present invention in the computer system.

FIG. 11 is a flow chart showing the steps of transferring the audio data taken by the microphone 15 to the main memory 12 and writing it into the HDD 13 using the DMAC 16.

The task B remains in its sleeping state until the audio buffer 150 is fully written with the audio data taken by the microphone 15 (Step S81). When the audio buffer 150 has fully been written, an interupt from the audio buffer 150 is carried out to issue a wake up instruction to the task B in the interupt handler, thereby waking up the task B. As the task B is waken up, the ID of a semaphore Z is recorded in the semaphore ID list field 34 of the task management data 30 of the task B (Step S82). Then, the semaphore Z is subjected to the P operation for exclusively controlling the audio buffer 150 (Step S83), so that the right for accessing the audio buffer 150 is given to the task B.

As the task B has obtained the right for accessing the audio buffer 150, the audio data is transferred from the audio buffer 150 to the main memory 12 (Step S84), and the V operation for the semaphore Z (Step S85) follows to release the right of the task B for accessing the audio buffer 150 and the ID of the semaphore Z is deleted from the task management data 30 of the task B (Step S86). It is then judged whether or not the main memory 12 has received one block (unit of transfer to the HDD 13) of the audio data (Step S87). The Step S81 through Step S86 are repeated until the main memory 12 is written with one block of the audio data ("NO" at Step S87).

When it is judged ("YES" at Step S77) that the main memory 12 has received one block of the audio data, the ID of a semaphore Y is recorded in the semaphore ID list field 34 of the task management data 30 of the task B (Step S88). Then, the semaphore Y is subjected to the P operation for exclusively controlling the HDD 13 (Step S89), so that the right for accessing the HDD 13 is given to the task B.

As the task B obtains the right for accessing the HDD 13, a DMA transfer for transferring the audio data from the main memory 12 to the HDD 13 is set (Step S90). As a result, the DMAC 16 transfers the audio data from the main memory 12 to the HDD 13 while the task B remains at its sleeping state until the transfer is completed (Step S91). After the DMA transfer is finished, an interupt occurs to issue a wake up instruction to the task B in the interupt handler, thereby waking up the task B. As the task B has been waken up, it starts the V operation for the semaphore Y (Step S92) to release the right for accessing the HDD 13, and then the ID of the semaphore Y is deleted from the task management data 30 of the task B (Step S93). The procedure is then returned back to Step S81.

In those steps, the video data taken by the camera 14 and the audio data taken by the microphone 15 are temporarily stored in their respective buffers and then stored in the HDD 13 through the multitask process with the tasks A and B. When the task A is abnormally terminated during its execution by any reason, the following process is different depending on whether it happens during the access to the video buffer 140 or the access to the HDD 13. When the task A is abnormally terminated during the access to the video buffer 140, the resetting of the video buffer 140 is needed. When the task A is abnormally terminated during the access to the HDD 13, stopping the DMA transfer and resetting of the HD controller 130 are needed.

Similarly, when the task B is abnormally terminated during its execution by any reason, the following process will be different depending on whether it happens during the access to the audio buffer 150 or the access to the HDD 13. When the task B is abnormally terminated during the access to the audio buffer 150, the resetting of the audio buffer 150 is needed. When the task B is abnormally terminated during the access to the HDD 13, stopping of the DMA transfer and resetting of the HD controller 130 are needed.

According to the exclusive control method for a computer system of the present invention, when the task A is abnormally terminated during obtaining the semaphore X, the abnormal termination procedure shown in FIG. 9 is executed. As a result, it is first found by checking the semaphore ID list field 34 of the task management data 30 of the task A that the task A is obtaining the semaphore X. Then, the task termination handler field 25 of the semaphore management data 20 of the semaphore X is checked, and a task termination handler i.e. the exception handler is activated. In the exception handler, processing at the time of abnormal termination for the resource managed by the semaphore X that is the video buffer 140 is described.

Accordingly, when the task A has been terminated abnormally during obtaining the semaphore X, the exception handler for the semaphore X is activated to execute the abnormal termination processing for the video buffer 140.

While the task A accesses to the HDD 13 by obtaining the semaphore Y, in this case, only it is necessary that the exception handler for the semaphore Y in which abnormal termination processing of the HDD 13 is described is registered to the task termination handler field 25 of the semaphore management data 20 of the semaphore Y.

Also, the task B, as show in FIG. 11, executes accessing to the audio buffer 150 by obtaining the semaphore Z as well as for accessing to the HDD 13 by obtaining the semaphore Y. Correspondingly, only it is necessary that the exception handler for the semaphore Z in which abnormal termination processing of the audio buffer 150 is described is registered to the task termination handler field 25 of the semaphore management data 20 of the semaphore Z. As to the semaphore Y, the exception handler for the semaphore Y in which abnormal termination processing of the HDD 13 is described is already registered to the task termination handler field 25 of the semaphore management data 20 of the semaphore Y as described above for the task A.

As described above, according to the exclusive control method for a computer system and the computer system of the present invention, the exception handlers for the time of abnormal termination of each semaphore for exclusive controlling shared resources are described and registered in advance. Although when the shared resources are shared by plural tasks, a single exception handler, not any combination, is described to each of the resources. The exception handler carries information about the post-stop procedure for the corresponding resource hence being minimized in the data size.

In case where the task is abnormally terminated, which resource the task accessed to can easily he identified from the task management data. Accordingly, no specific programs is necessary and a corresponding exception handler can he selected and activated.

As this present invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An exclusive control method for a computer system for controlling an obtaining process, which obtains an exclusive control module indicating an exclusive use right of a corresponding resource commonly shared by two or more processes, so as to obtain the exclusive use right of the corresponding resource, and for controlling the obtaining process, when said process releases the exclusive control module, so as to lose the exclusive use right of corresponding resource, comprising the steps of:

registering for each exclusive control module a program in which a procedure is described for processing a resource exclusively controlled by the corresponding exclusive control module after the process which has obtained that module is abnormally terminated; and when a process is abnormally terminated with an exclusive control module obtained, activating the program registered to said exclusive control module obtained by said abnormally terminated process.

2. A computer system having a plurality of shared resources whose exclusive use rights by a process are indicated by respective exclusive control modules, in which, when a process obtains one of the exclusive control modules, the process is controlled so as to obtain an exclusive use right of the resource corresponding to the exclusive control module obtained by said process, and when the process releases the exclusive control module, the process is controlled so as to lose the exclusive use right of the resource corresponding to the released exclusive control module, comprising:

exclusive control module managing means to which is registered information identifying a program containing a procedure for processing a resource exclusively controlled by the corresponding exclusive control module after the process is abnormally terminated, for each of the exclusive control modules;

process managing means, when said process obtains the exclusive control module, to which is recorded information identifying the exclusive control module obtained by said process;

means for, when said process is abnormally terminated with the exclusive control module obtained, reading the information identifying the exclusive control module from said process managing means of said process; and means for activating the program registered with the exclusive control module managing means for a particular resource after the process is abnormally terminated which has obtained the corresponding exclusive control module.

3. A computer system having a CPU, storing means which can be accessed by said CPU, a plurality of shared resources whose exclusive use rights by a process processed by said CPU are indicated by respective exclusive control modules, in which, when a process obtains one of the exclusive control modules, the process is controlled so as to obtain an exclusive use right of the resource corresponding to the exclusive control module obtained by said process, and when the process releases the exclusive control module, the process is controlled so as to lose the exclusive use right of the resource corresponding to the released exclusive control module, wherein said storing means stores for each exclusive control module exclusive control module management information identifying a program in which a procedure is described for processing a resource exclusively controlled by the corresponding exclusive control module after the process which has obtained the exclusive control module is abnormally terminated, and stores, when the process obtains the exclusive control module, a process management information identifying the exclusive control module obtained by said process; and said CPU, when the process is terminated with the exclusive control module obtained, reads out the process management information corresponding to the terminated process from said storing means so as to identify the exclusive control module obtained by the process, reads out the exclusive control module management information of the identified exclusive control module from said storing means so as to identify the program in which the procedure is described for processing a resource after the process is abnormally terminated, and activates the identified program.

* * * * *